United States Patent [19]

Wolff et al.

[11] Patent Number: 5,401,789
[45] Date of Patent: Mar. 28, 1995

[54] PROCESS FOR THE PRODUCTION OF PLASTIC AND RUBBER COMPOSITIONS FILLED WITH CARBON BLACK

[75] Inventors: Siegfried Wolff, Bornheim-Merten; Udo Goerl, Bornheim-Roisdorf both of Germany

[73] Assignee: Degussa Aktiengesellschaft, Frankfurt am Main, Germany

[21] Appl. No.: 892,990

[22] Filed: Jun. 3, 1992

[30] Foreign Application Priority Data

Jun. 18, 1991 [DE] Germany .............. 41 19 959.6

[51] Int. Cl.⁶ .................................................. C08K 5/54
[52] U.S. Cl. .................................. 524/188; 523/213; 524/495; 524/496
[58] Field of Search ............... 524/188, 495, 496; 523/213

[56] References Cited

U.S. PATENT DOCUMENTS

| | | | |
|---|---|---|---|
| 4,128,438 | 6/1980 | Wolff et al. | 523/213 |
| 4,273,697 | 6/1981 | Simimura et al. | 524/495 |
| 4,387,046 | 6/1983 | Marsch et al. | 524/495 |
| 4,457,799 | 7/1984 | Dunn | 156/307 |
| 4,518,434 | 5/1985 | Wilder | 524/496 |
| 4,522,852 | 6/1985 | Dunn | 428/36 |
| 4,820,751 | 4/1989 | Takeshita et al. | 523/215 |
| 5,159,009 | 10/1992 | Wolff et al. | 524/495 |
| 5,174,924 | 12/1992 | Yamada et al. | 524/495 |
| 5,187,223 | 2/1993 | Asatsuma et al. | 524/495 |

FOREIGN PATENT DOCUMENTS

| | | |
|---|---|---|
| 0089162 | 9/1983 | European Pat. Off. |
| 0468140 | 1/1992 | European Pat. Off. |
| 3813678 | 11/1988 | Germany |
| 2056995 | 6/1990 | United Kingdom |

OTHER PUBLICATIONS

World Patents Index Latest, Week 8125, Derwant Publications Ltd., Class A, AN 81-45424 and SU 767,147.

Primary Examiner—Paul R. Michl
Assistant Examiner—Edward Cain
Attorney, Agent, or Firm—Beveridge, DeGrandi, Weilacher & Young

[57] ABSTRACT

A process for the production of plastic and rubber compositions filled with carbon black in which an organosilicon compound is used and is reacted in situ with the carbon black. The organosilicon compound is selected from the following formulae:

$$(R^1{}_n-(RO)_{3-n}Si-(Alk)_m-(Ar)_p)_q(B) \quad \quad (I)$$

$$R^1{}_n-(RO)_{3-n}Si-(Alkyl) \quad \quad (II)$$

or $$R^1{}_n-(RO)_{3-n}Si-(Alkenyl) \quad \quad (III)$$

in which
  B=—SCN, —SH, —Cl—NH₂(where q=1) or —S$_x$— (where q=2),
  R=a C$_{1-4}$ alkyl or C$_{1-4}$ alkoxy group or a phenyl group,
  R¹=a C$_{1-4}$ alkyl group or a phenyl group,
  n=0, 1 or 2,
  Alk=a difunctional, linear or branched C$_{1-6}$ hydrocarbon radical,
  m=0 or 1,
  Ar=a C$_{6-12}$ preferably C$_6$ arylene radical,
  p=0 or 1, with the proviso that p and n cannot both be 0,
  x=a number from 2 to 8,
  Alkyl=a monofunctional, linear or branched unsaturated C$_{1-20}$ and preferably C$_{2-8}$ hydrocarbon radical,
  Alkenyl=a monofunctional, linear or branched unsaturated C$_{2-20}$ and preferably C$_{2-6}$ hydrocarbon radical.

21 Claims, 2 Drawing Sheets

PROCESS FOR THE PRODUCTION OF PLASTIC AND RUBBER COMPOSITIONS FILLED WITH CARBON BLACK

BACKGROUND AND INTRODUCTION

The present invention relates to a process for the production of vulcanizable plastic and rubber compositions filled with carbon black in which one or more organosilicon compounds are incorporated.

It has long been known that oxidic surfaces can be treated with organosilicon compounds containing alkoxy groups (U.S. Pat. No. 3,227,675; EP 0,177,674; EP-PS 0,126,871). The object of all these efforts was and is to establish a bond between the inorganic component, the oxidic filler, whether for example glass or even silicate fillers of the type used for example in the rubber industry (e.g., precipitated and pyrogenic silicas, clays, aluminum silicates etc.), and an organic polymer differing widely in its chemical composition. This generally leads to an improvement in the properties of the vulcanizates. Carbon blacks, for example furnace blacks, lampblacks and gas blacks are not included among the oxidic fillers. The reaction between the alkoxysilyl groups and the OH groups on the surface which takes place in oxidic filler substances cannot take place on the carbon black so that the establishment of a chemical bond between the carbon black and the organosilicon compound would not appear to be possible.

Although granular mixtures of carbon black and organosilicon compounds are known from DE-PS 2,747,277 (U.S. Pat. No. 4,128,438), these mixtures are used for more effectively incorporating the organosilicon compound in silica-containing rubber compounds. In this case, the carbon black merely acts as a carrier for liquid organic silanes which are to be converted into the solid state. The silane can be removed from such mixtures by extraction with organic solvents.

Since, hitherto, attempts have always been made to establish the properties of carbon-black-filled rubber vulcanizates through the use of carbon blacks differing in their structure and specific surface, the problem now arises of improving the properties of vulcanizates through the use of silane-modified carbon blacks.

According to German patent application P 40 23 537, it is possible by adopting a suitable procedure to bind considerable quantities of organosilicon compounds to carbon black, depending on the surface and structure of the carbon and also upon the type of compounds used.

SUMMARY OF THE INVENTION

The present invention describes a process for the production of vulcanizable plastic and rubber compositions filled with carbon black, characterized in that one or more organosilicon compounds corresponding to the following general formulae:

$$(R^1{}_n-(RO)_{3-n}Si-(Alk)_m-(Ar)_p)_q(B) \quad (I)$$

$$R^1{}_n-(RO)_{3-n}Si-(Alkyl) \quad (II)$$

or $$R^1{}_n-(RO)_{3-n}Si-(Alkenyl) \quad (III)$$

in which

B=—SCN, —SH, —Cl—NH$_2$(where q=1) or —S$_x$— (where q=2),
R=a C$_{1-4}$ alkyl or C$_{1-4}$ alkoxy group or a phenyl group,
R$^1$=a C$_{1-4}$ alkyl group or a phenyl group,
n=0, 1 or 2,
Alk=a difunctional, linear or branched C$_{1-6}$ hydrocarbon radical,
m=0 or 1,
Ar=a C$_{6-12}$ preferably C$_6$ arylene radical,
p=0 or 1, with the proviso that p and n cannot both be 0,
x=a number from 2 to 8,
Alkyl=a monofunctional, linear or branched unsaturated C$_{1-20}$ and preferably C$_{2-8}$ hydrocarbon radical,
Alkenyl=a monofunctional, linear or branched unsaturated C$_{2-20}$ and preferably C$_{2-6}$ hydrocarbon radical, are incorporated in the vulcanizable composition in quantities corresponding to the quantity which is determined as no longer extractable with an organic solvent in the reaction of carbon black and the particular organosilicon compound. The corresponding method for determining this quantity is described in German patent application P 40 23 537 (corresponding to U.S. patent application Ser. No. 07/716,108 which is incorporated by reference in its entirety).

DETAILED DESCRIPTION OF THE INVENTION

Figure 1:
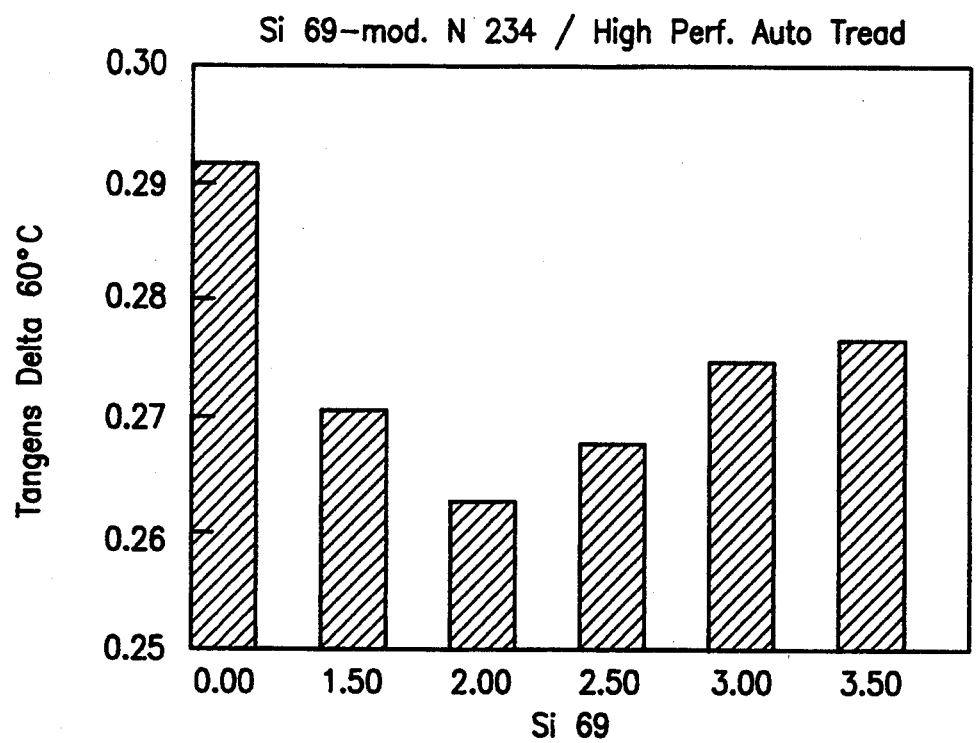
FIGS. 1-3 show loss angle tan δ at 60° C., heat build-up and ball rebound, respectively, of the automobile tread of Example IV.

In general, the quantity in question of the organosilicon compounds is a quantity of 0.1 to 30 parts by weight of one or more organosilicon compounds, preferably a quantity of 0.5 to 15 parts by weight and, more preferably, a quantity of 0.5 to 4 parts by weight, based on 100 parts by weight carbon black.

It has been found that the quantity of organosilicon compounds which can be maximally bound to the particular carbon black and, hence, can no longer be extracted by organic solvents, particularly diethyl ether, also results in the optimal rubber performance obtainable depending upon the carbon black and the organosilicon compounds.

Larger extractable quantities of the compound(s) not only do not lead to any further improvement in the properties of vulcanizates, they actually result in a deterioration in the rubber property spectrum.

Suitable carbon blacks are carbon blacks for purposes of the present invention with alkaline pH value which belong to any of the various classes known in rubber technology, for example furnace blacks (classification according to ASTM D 1765), lampblacks and gas blacks, and also non-rubber carbon blacks. These carbon blacks are added to the plastic and rubber compositions in quantities of 5 to 250 parts and preferably in quantities of 50 to 100 parts, based on 100 parts rubber or plastic.

The optimal quantities of organosilanes may also be determined by testing the rubber behavior of the vulcanizates in a range of concentrations and thus ascertaining the most suitable ratio of carbon black to organosilicon compound.

The exactly defined concentration required to obtain optimal properties for the product can be subsequently transferred from one organosilane to another through the equimolar bases, for example on the basis of the trialkoxysilyl groups, where bis-(triethoxysilylpropyl)-tetrasulfane (TESPT or Si69) is used to modify the carbon black, as is the case in the Examples.

Whereas, in the case of silicate fillers, the modification with an organosilane is carried out during incorporation in almost every case, this procedure could not be regarded as entirely suitable for carbon blacks because the speed of the reaction between carbon black and organosilane was not predictable.

It has been found that, in general, the number of hydrolyzable groups —(OR) is equivalent to the concentration of oxygen-containing groups (in mval) present on the surface of the carbon black. This is surprising in view of the diversity of the oxygen-containing groups on the surface of the carbon black (H. P. Boehm, Voll, Carbon 9 (1971), 481 et seq.; J. P. Bonnet et al., Rubber Conf. Proc. Sydney, 1988, Vol. 1, pages 113 et seq.). This is another possible method of determining the optimum quantity of organosilane to be used.

Accordingly, there are three different methods by which the quantity of organosilicon compounds can be bound and hence the optimal quantity of organosilicon compounds can be determined, naturally within the margins of error of these methods.

Suitable rubbers are rubbers, plastics and mixtures thereof which can be crosslinked with sulfur and vulcanization accelerator(s) and also with peroxide to form elastomers. These include the so-called diene elastomers, i.e. for example oil-extended natural and synthetic rubbers, such as natural rubbers, terpolymers of ethylene, propylene and unconjugated dienes; copolymers of ethylene and propylene and also carboxyl rubbers, epoxy rubbers, transpolypentenamer, halogenated butyl rubbers, rubbers of 2-chlorobutadiene, ethyl/vinyl acetate copolymers and, optionally, chemical derivatives of natural rubber and modified natural rubbers. Any suitable natural or synthetic vulcanizable rubber can be used for purposes of the invention.

The natural or synthetic vulcanizable rubber compositions produced in accordance with the present invention contain other components typically used in the rubber industry such as, for example:

vulcanization accelerators typically used in the rubber industry (for example sulfenamides, 2-mercaptobenzthiazole (MBT), di-2-benzothiazyl disulfide (MBTS, triazine accelerators, thiurams), either individually or in admixture, in quantities of 0.1 to 10 parts by weight, based on 100 parts by weight rubber;

vulcanization retarders such as, for example, Vulkalent E, di-(phenylthio)acetamide (PVI), again in quantities of 0.1 to 10 parts by weight, based on 100 parts by weight rubber;

zinc oxide and stearic acid as vulcanization promoters in quantities of 0.5 to 10 parts by weight, based on 100 parts by weight rubber;

antioxidants, antiozonants and antifatigue agents used in the rubber industry, including for example N-isopropyl-N'-phenyl-p-phenylenediamine (IPPD), poly-2,2,4-trimethyl-1,1,2-dehydroquinoline (TMQ) and also waxes as light stabilizers and mixtures thereof;

Plasticizers such as, for example, aromatic, naphthenic, paraffinic, synthetic plasticizers and blends thereof;

optionally sulfur in a quantity of 0.1 to 10 parts by weight per 100 parts by weight rubber;

optionally dyes and processing aids in the usual quantities known in the art.

The compositions are produced by methods known in the rubber industry, for example in an internal mixer or on mixing rolls. Mixing temperatures of up to 250° C. may be applied. Mixing equipment and conditions are well known in the art.

By comparison with known compounds, the process according to the present invention (in which carbon black and organosilane are preferably introduced simultaneously) lead to a distinct improvement in the moduli, elasticity, dynamic properties and loss angle tan δ of the vulcanizates produced from the rubber and plastic compounds.

The range of application of the silane-modified carbon blacks according to the present invention extends to compounds of the type typically used in tire manufacture, for example in the belt, carcass and bead regions, in side wall compounds and binding compounds, and to industrial articles such as, for example, conveyor belts, V-belts, hoses, seals, engine mountings, spring and damping elements and rubber-coated fabrics.

Test standards for practical application:

|  | Test method |
| --- | --- |
| Rheometer | DIN 53 529 |
| Mooney test | DIN 53 524 |
| Tensile strength | DIN 53 504 |
| Elongation at break | DIN 53 507 |
| Modulus at 100%, 200%, 300% | DIN 53 507 |
| Firestone ball rebound | AD 20 245 |
| Shore A hardness | DIN 53 505 |
| Goodrich Flexometer | ASTM D 623-62 |
| Heat build-up | DIN 53 513 |
| MTS | DIN 53 513 |

EXAMPLE I

Example I shows the quantity of bindable silane, as determined for Degussa carbon blacks. The effect of the BET surface on the quantity of bindable Si 69 (bis-(triethoxysilylpropyl)-tetrasulfane (TESPT)) can clearly be seen.

| Silane-modified carbon blacks | | |
| --- | --- | --- |
|  | BET | DBP | Opt. quantity of Si 69 in pbw per 100 pbw carbon black |
| Printex 90/Si 69 | 300 | 800 | 4.7 |
| N 115/Si69 | 145 | 114 | 3.3 |
| N 234/Si69 | 125 | 125 | 2.2 |
| N 220/Si69 | 115 | 114 | 2.1 |
| N 375/Si69 | 96 | 114 | 1.9 |
| N 330/Si69 | 82 | 102 | 1.8 |
| N 326/Si69 | 83 | 72 | 1.8 |
| N 550/Si69 | 42 | 121 | 1.5 |
| N 660/Si69 | 35 | 90 | 1.2 |
| N 683/Si69 | 37 | 133 | 1.0 |
| N 765/Si69 | 35 | 122 | 0.8 |
| Durex O/Si69 | 20 | 104 | 0.4 |

The carbon black compounds in the left hand column above are well known in the rubber industry.

EXAMPLE II

Comparison between N 234 (1) and N 234 with in situ addition of Si 69 (2) in an automobile tread compound:

|  |  | 1 | 2 |
|---|---|---|---|
| SBR 1500 |  | 50 | 50 |
| (styrene-butadiene rubber) |  |  |  |
| SBR 1712 |  | 68.75 | 68.75 |
| CORAX N 234 |  | 60 | 60 |
| (carbon black made by Degussa AG) |  |  |  |
| Si 69 |  | — | 1.5 |
| ZnO RS |  | 3 | 3 |
| Stearic acid |  | 2 | 2 |
| Vulkanox 4010 NA |  | 1.5 | 1.5 |
| (N-isopropyl-N'-phenyl-p-phenylene diamine) |  |  |  |
| Protector G 35 |  | 1 | 1 |
| (ozone protective wax) |  |  |  |
| Vulkacit CZ |  | 1.6 | 1.6 |
| (benzothiazyl-2-cyclohexylsulfenamide) |  |  |  |
| Sulfur |  | 1.8 | 1.8 |
| Rheometer: 165° C. |  |  |  |
| $D_{max}-D_{min}$ | (Nm) | 7.81 | 8.69 |
| Reversion | (%) | 9.8 | 5.8 |
| Vulcanizate data: 165° C., $t_{95\%}$ |  |  |  |
| Tensile strength | (MPa) | 20.7 | 22.2 |
| Modulus 300% | (MPa) | 10.3 | 11.8 |
| Firestone ball rebound | (%) | 34.0 | 34.8 |
| Shore A hardness |  | 68 | 71 |
| Goodrich Flexometer: (RT, 108N, 0.175 inch, 18 h) |  |  |  |
| Delta T center | (°C.) | 149.5 | 144.9 |
| Dyn. Compression | (%) | 25.5 | 22.8 |
| MTS test |  |  |  |
| Dyn. elasticity modulus (Mpa) 0° C. |  | 38.8 | 42.6 |
|  | 60° C. | 11.7 | 13.0 |
| Loss angle tan δ | 0° C. | 0.317 | 0.300 |
|  | 60° C. | 0.224 | 0.209 |

The addition of Si 69 to the carbon black mixture leads to an increase in the crosslinking yield, modulus, tensile strength, elasticity and Shore hardness.

Among the Flexometer data, delta T center shows a reduced heat build-up and lower dynamic compression.

The relatively low loss angle tan δ at 60° C. is indicative of relatively low rolling resistance of the silane-treated compound.

EXAMPLE III

Comparison between N 110(1) and N110 with in situ addition of Si 69 (2) in a lorry tread compound:

|  |  | 1 | 2 |
|---|---|---|---|
| RSS 1 (ML (1 + 4) = 70–80) |  | 100 | 100 |
| CORAX N 110 |  | 45 | 45 |
| Si 69 |  | — | 1.5 |
| ZnO RS |  | 4 | 4 |
| Stearic acid |  | 3 | 3 |
| Protector G 35 |  | 1.5 | 1.5 |
| Vulkanox 4010 NA |  | 2 | 2 |
| Vulkacit HS |  | 1 | 1 |
| (2,2,4-trimethyl-1,2-dihydroquinoline) |  |  |  |
| Naftolen ZD |  | 5 | 5 |
| (aromatic plasticizer) |  |  |  |
| Vulkacit MOZ |  | 1.18 | 1.18 |
| (benzothiazyl-2-sulfene-morpholine) |  |  |  |
| Sulfur |  | 1.07 | 1.07 |
| Rheometer: 145° C. |  |  |  |
| $D_{max}-D_{min}$ | (Nm) | 6.97 | 7.71 |
| $D_{min}$ | (Nm) | 1.08 | 0.91 |
| Mooney Viscosity |  |  |  |
| ML (1 + 4) (100° C.) | (ME) | 75 | 69 |
| Vulcanizate data: 145° C., $t_{95\%}$ |  |  |  |
| Tensile strength | (MPa) | 25.7 | 25.9 |
| Modulus 300% | (MPa) | 7.5 | 8.8 |
| Firestone ball rebound | (%) | 42.2 | 47.4 |
| Shore A hardness |  | 62 | 64 |
| Goodrich Flexometer: (RT, 108 N, 0.175 inch, 18 h) |  |  |  |
| delta T center | (°C.) | 95.1 | 87.4 |
| Dyn. compression | (%) | 25.0 | 21.2 |
| MTS test |  |  |  |
| Dyn. elasticity | (MPa) 0° C. | 11.9 | 12.8 |
|  | 60° C. | 7.5 | 8.0 |
| Loss angle tan δ | 0° C. | 0.254 | 0.242 |
|  | 60° C. | 0.138 | 0.125 |

EXAMPLE IV

Dependence of optimal rubber performance on the quantity of silane applied to the carbon black.

High-performance automobile tread with N 234 as carbon black and bis-(triethoxysilylpropyl)-tetrasulfane as silane, formulation:

| Buna 1712 | 55 |  |
|---|---|---|
| Buna 1721 | 55 |  |
| Buna CB 30 | 30 |  |
| N 234 | 90 |  |
| Si 69 | 0 | —3.5 |
| ZnO RS | 3 |  |
| Stearic acid | 1.5 |  |
| Naftolen ZD | 12 |  |
| Protector G 35 | 1.5 |  |
| Vulacit NZ | 2.6 |  |
| Sulfur | 1.6 |  |

Buna 1712 and 1721 are a styrene-butadiene rubber.

Figure 2:
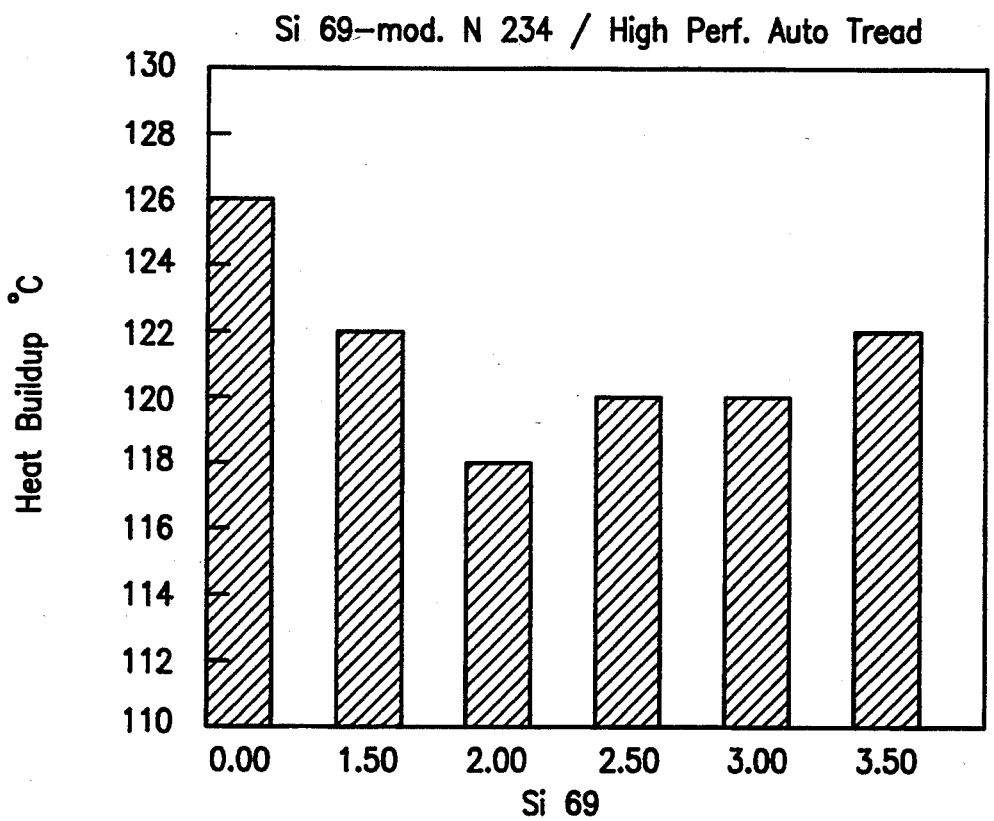
Figure 3:
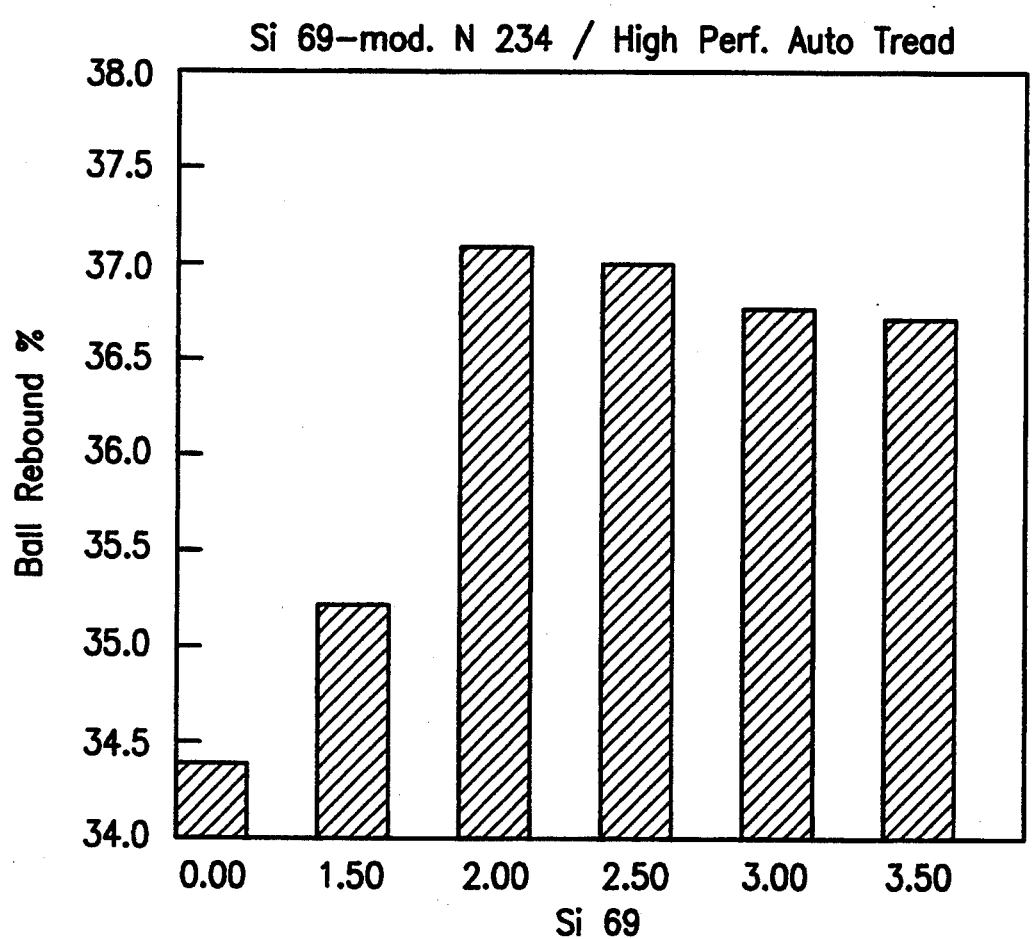

This Example shows that the loss angle tan δ at 60° C., a parameter for rolling resistance, decreases with increasing Si 69 concentration and then deteriorates again beyond a quantity of 2 parts Si 69 to 90 parts N 234; the same applies to heat build-up and to ball rebound (FIGS. 1–3).

Further variations and modifications of the invention will become apparent to those skilled in the art from the foregoing and are intended to be encompassed by the claims appended hereto.

German Priority Application P 41 19 959.6, filed on Jun. 18, 1991, is relied on and incorporated by reference.

What is claimed:

1. A process for the production of a vulcanizable plastic or rubber composition, comprising incorporating one or more organosilicon compounds of the following formulae:

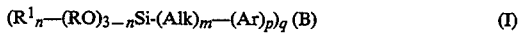

$(R^1{}_n-(RO)_{3-n}Si-(Alk)_m-(Ar)_p)_q(B)$      (I)

$R^1{}_n-(RO)_{3-n}Si-(Alkyl)$      (II)

or

$R^1{}_n-(RO)_{3-n}Si-(Alkenyl)$      (III)

in which

B=—SCN, —SH, —Cl (where q=1) or —$S_x$— (where q=2),

R=a $C_{1-4}$ alkyl or $C_{1-4}$ alkoxy group or a phenyl group, $R^1$=a $C_{1-4}$ alkyl group or a phenyl group, n=0, 1 or 2, Alk = a difunctional, linear or branched $C_{1-6}$ hydrocarbon radical, m = 0 or 1, Ar = a $C_{6-12}$ arylene radical, p = 0 or 1, with the proviso that p and n cannot both be 0, x = a number from 2 to 8, Alkyl = a monofunctional, linear or branched unsaturated $C_{1-20}$ hydrocarbon radical, Alkenyl = a monofunctional, linear or branched unsaturated $C_{2-20}$ hydrocarbon radical, and carbon black with an alkaline pH value into said vulcanizable composition in a quantity corresponding to the quantity which is determined as no longer extractable with an organic solvent in the reaction of carbon black with an alkaline pH value and said organosilicon compound; wherein said vulcanizable composition does not contain silica and wherein said carbon black has a specific surface area of less than or equal to 300 $m^2/g$.

2. The process according to claim 1, wherein said Ar is $C_6$ arylene radical.

3. The process according to claim 1, wherein said Alkyl is $C_{2-8}$ hydrocarbon radical.

4. The process according to claim 1, wherein said Alkenyl is $C_{2-6}$ hydrocarbon radical.

5. The process according to claim 1 wherein said quantity is 0.1 to 30 parts by weight per 100 parts by weight carbon black.

6. The process according to claim 5, wherein said quantity is 0.5 to 15 parts by weight.

7. The process according to claim 6, wherein said quantity is 0.5 to 4 parts by weight.

8. The process according to claim 1, wherein said vulcanizable composition contains 5 to 250 parts by weight of said carbon black per 100 parts by weight rubber or plastic.

9. The process according to claim 8, wherein said vulcanizable composition contains 50 to 100 parts by weight of said carbon black.

10. The process according to claim 1, wherein said rubber is selected from the group consisting of diene elastomers, copolymers of ethylene and propylene, carboxyl rubbers, epoxy rubbers, transpolypentenamer, halogenated butyl rubbers, rubbers of 2-chlorobutadiene, ethyl/vinyl acetate copolymers, and chemical derivatives of natural rubber and modified natural rubbers.

11. The process according to claim 10, wherein said diene elastomers are oil-extended natural and synthetic rubbers.

12. The process according to claim 11, wherein said rubbers are natural rubbers, terpolymers of ethylene, propylene and unconjugated dienes.

13. The process according to claim 1 in which said carbon black and organosilicon compounds are introduced simultaneously.

14. A vulcanizable plastic or rubber composition produced by the process according to claim 1.

15. A vulcanized plastic or rubber composition produced by the process according to claim 1.

16. A tire comprising the vulcanized plastic or rubber composition according to claim 15.

17. An industrial article comprising the vulcanized plastic or rubber composition according to claim 15.

18. The process according to claim 1, wherein said carbon black has a specific surface area of 20 to $\geq 300$ $m^2/g$.

19. The process according to claim 1, consisting essentially of incorporating one or more organosilicon compounds of the following formulae:

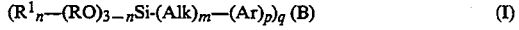

$$(R^1{}_n—(RO)_{3-n}Si\text{-}(Alk)_m—(Ar)_p)_q (B) \quad (I)$$

$$R^1{}_n—(RO)_{3-n}Si\text{-}(Alkyl) \quad (II)$$

or

$$R^1{}_n—(RO)_{3-n}Si\text{-}(Alkenyl) \quad (III)$$

in which

B = —SCN, —SH, —Cl (where q=1) or —$S_x$— (where q=2),

R = a $C_{1-4}$ alkyl or $C_{1-4}$ alkoxy group or a phenyl group, $R^1$ = a $C_{1-4}$ alkyl group or a phenyl group, n = 0, 1 or 2, Alk = a difunctional, linear or branched $C_{1-6}$ hydrocarbon radical, m = 0 or 1, Ar = a $C_{6-12}$ arylene radical, p = 0 or 1, with the proviso that p and n cannot both be 0, x = a number from 2 to 8, Alkyl = a monofunctional, linear or branched unsaturated $C_{1-20}$ hydrocarbon radical, Alkenyl = a monofunctional, linear or branched unsaturated $C_{2-20}$ hydrocarbon radical, and carbon black with an alkaline pH value into said vulcanizable composition in a quantity corresponding to the quantity which is determined as no longer extractable with an organic solvent in the reaction of carbon black with an alkaline pH value and said organosilicon compound; wherein said vulcanizable composition does not contain silica.

20. The process according to claim 19, wherein said carbon black has a specific surface area of less than or equal to 300 $m^2/g$.

21. The process according to claim 19, wherein said carbon black has a specific surface area of 20 to less than or equal to 300 $m^2/g$.

* * * * *